(12) United States Patent
Raghavan et al.

(10) Patent No.: US 12,518,528 B2
(45) Date of Patent: Jan. 6, 2026

(54) METHODS AND SYSTEMS FOR ORDERING IMAGES IN A GRAPHICAL USER INTERFACE

(71) Applicant: Shopify Inc., Ottawa (CA)

(72) Inventors: Kshetrajna Raghavan, Fremont, CA (US); Roni Gurvich, Ramat Gan (IL); Hettige Ray Perera Jayatunga, Toronto (CA)

(73) Assignee: Shopify Inc., Ottawa (CA)

( * ) Notice: Subject to any disclaimer, the term of this patent is extended or adjusted under 35 U.S.C. 154(b) by 918 days.

(21) Appl. No.: 17/712,254

(22) Filed: Apr. 4, 2022

(65) Prior Publication Data

US 2023/0316748 A1 Oct. 5, 2023

(51) Int. Cl.
*G06V 20/30* (2022.01)
*G06Q 30/0601* (2023.01)
*G06V 10/56* (2022.01)
*G06V 10/70* (2022.01)
*G06V 10/74* (2022.01)
*G06V 10/764* (2022.01)
*G06V 10/94* (2022.01)

(52) U.S. Cl.
CPC ......... *G06V 20/30* (2022.01); *G06Q 30/0641* (2013.01); *G06V 10/56* (2022.01); *G06V 10/74* (2022.01); *G06V 10/764* (2022.01); *G06V 10/87* (2022.01); *G06V 10/945* (2022.01)

(58) Field of Classification Search
CPC ........ G06V 20/30; G06V 10/56; G06V 10/74; G06V 10/764; G06V 10/87; G06V 10/945; G06Q 30/0641
See application file for complete search history.

(56) References Cited

U.S. PATENT DOCUMENTS

| 9,218,607 | B1 * | 12/2015 | Steves | G06Q 30/0201 |
| 11,532,036 | B2 * | 12/2022 | Kumar | G06V 10/70 |
| 2010/0080470 | A1 * | 4/2010 | Deluca | G06V 20/70 382/209 |
| 2023/0177836 | A1 * | 6/2023 | Solmaz | G06V 20/46 382/100 |

* cited by examiner

*Primary Examiner* — Amandeep Saini
*Assistant Examiner* — Daniella M. DiGuglielmo
(74) *Attorney, Agent, or Firm* — Rowand LLP

(57) ABSTRACT

Methods and systems for automatically ordering a set of images. The methods may include receiving a set of further images related to a first record, the first record referencing an ordered set of existing images, each of the existing images being assigned one or more respective image attributes. It may include assigning, using image analysis, one or more respective image attributes to each image in the set of further images and comparing image attributes assigned to the further images with image attributes assigned to the existing images to determine, for each of the further images, a corresponding one of the existing images. The further images are then ordered based on the determined corresponding ones of the existing images and the ordering of those existing images in the ordered set of existing images, and displayed in order in a user interface.

20 Claims, 10 Drawing Sheets

FIG. 11

METHODS AND SYSTEMS FOR ORDERING IMAGES IN A GRAPHICAL USER INTERFACE

TECHNICAL FIELD

The present disclosure relates to computer-implemented user interfaces, and more particularly to, methods and systems for automating the ordering of images in a graphical user interface.

BACKGROUND

The usability of a computing interface can be dependent upon its layout and consistency. In e-commerce, in particular, the functionality of the user interface is key to ensuring optimal usability and user retention. Frustrating or confusing interfaces result in lost users and make e-commerce sites unsuccessful.

On some websites, like e-commerce sites, users may rely on images to assess a product or service or other item. When comparing similar items, a user might navigate between similar product/service pages and review the available images to compare the products/services. In some cases this may be done in a serial manner, or can be done in parallel using side-by-side windows or browser instances. Some sites facilitate product comparison by providing a comparison page in which two or more selected product records are displayed together.

BRIEF DESCRIPTION OF THE DRAWINGS

Embodiments will be described, by way of example only, with reference to the accompanying figures wherein:

FIG. 11 is an example of a home page of an administrator, in accordance with an example embodiment.

Like reference numerals are used in the drawings to denote like elements and features.

DETAILED DESCRIPTION OF EMBODIMENTS

Figure 1:
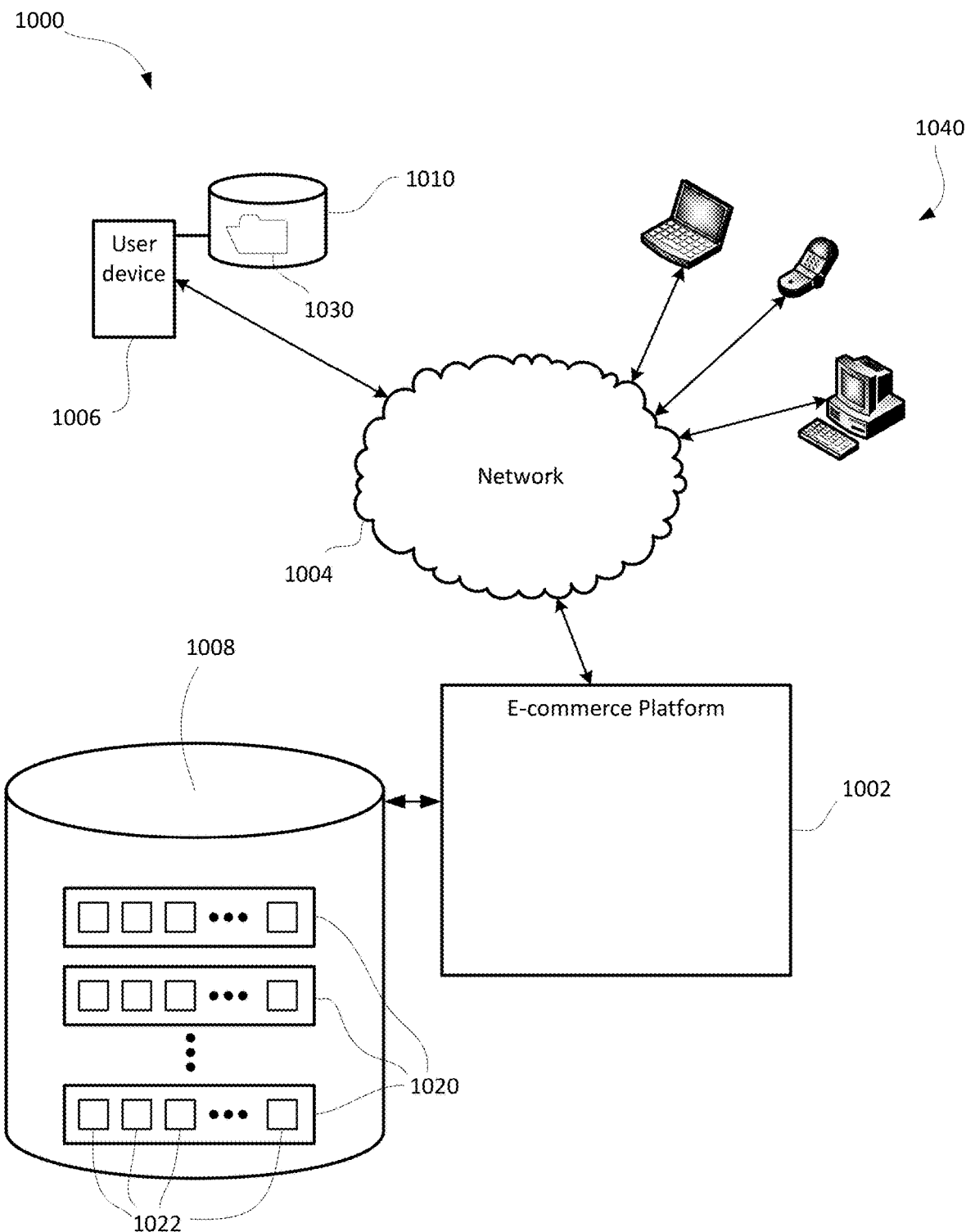
FIG. 1 is a simplified example system.

In one aspect, the present application discloses a computer-implemented method. The method may include receiving a set of further images related to a first record, the first record referencing an ordered set of existing images, each of the existing images being assigned one or more respective image attributes; generating, based on the first record, a new record referencing the set of further images; assigning, using image analysis, one or more respective image attributes to each image in the set of further images; comparing image attributes assigned to the further images with image attributes assigned to the existing images to determine, for each of the further images, a corresponding one of the existing images; ordering the further images based on the determined corresponding ones of the existing images and the ordering of those existing images in the ordered set of existing images; and causing display, within a graphical user interface, of the plurality of further images as ordered.

In some implementations, the set of further images is related to the first record on the basis that the set of further images depict a variant of an item shown in the ordered set of existing images.

In some implementations, the set of further images is related to the first record on the basis that the first record relates an item in a product class, and the set of further images contains a new item in the product class.

In some implementations, receiving the set of further images includes receiving a plurality of images related to the first record, identifying one or more dominant colours in each of the images in the plurality of images, grouping the images within the plurality of images into non-overlapping sets of images based on all images in each non-overlapping set having the same one or more dominant colours, and wherein the set of further images is one of the non-overlapping sets.

In some implementations, the method further includes determining that the set of further images are related to the first record by performing object detection within one or more of the further images to identify a subject item, and determining that the first record is for an item corresponding to the subject item. In some cases, determining that the first record is for an item corresponding to the subject item is based on determining that the item and the subject item are variants of the same product.

In some implementations, the image attributes include one or more of a view direction, a product style option, or a visual product feature. In some cases, the image attributes assigned are selected from a set of image attributes associated with a product class for the first record.

In some implementations, each of the existing images has an order index indicating its position in the ordered set, and wherein ordering the further images includes assigning each of the further images the order index of its respective corresponding one of the existing images. In some cases, the image attributes include a view direction, and wherein comparing includes matching the view direction assigned to each further image in the set of further images with a same view direction assigned to the corresponding ones of the existing images and, based on that matching, assigning to each of the further images the order index of its respective corresponding one of the existing images.

In some implementations, the method may further include selecting a machine learning model from a set of models based on a product type associated with the first record, and wherein assigning, using image analysis, includes applying the machine learning model to identify the image attributes to be assigned to the further images.

In some implementations, comparing further includes determining that none of the images in the set of further images have assigned image attributes that match an image attribute assigned to one of the existing images and, in response, outputting a warning notification regarding a missing image for the new record.

In some implementations, the method may further include receiving, from an administrator device, the ordered set of existing images and assigning, by a machine learning model, the one or more respective image attributes to each of the existing images.

In another aspect, the present application discloses a computing device having a processor and memory. The memory may store instructions that, when executed by the processor, cause the processor to carry out one of the methods or processes described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. In particular, the sales channels may themselves be e-commerce platforms, such as Facebook Shops™, Amazon™, etc. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

The term "variant" as used herein in connection with products or other items, is intended to refer to a case where there are two product records for the same product item, e.g. a specific brand/model of shoe or dress or smartphone or appliance, etc., but the two records reflect two variations of that product item, e.g. two different colours, finish options, etc. In particular, the term "variant" refers to the case where the two product records have respective sets of images of the product item and in which the variation may be visually evident in at least some of the images, e.g. the different colour, finish, etc. Conversely, two products in the same product class may refer to two different products or models of a product, e.g. two different models of dishwasher, or two different models of shoe, or two different smartphones. The two different products may be from the same source (e.g. manufacturer) or from different sources, whereas two variants are always from the same source.

As noted above, users may rely on images to assess an item. In many contexts, an item may have a set of associated images depicting the item in various views, states, or highlighting certain features. When comparing similar items, a user might navigate between similar pages and review the available sets of images to compare items. In some cases this may be done in a serial manner, or can be done in parallel using side-by-side windows or browser instances. Some sites facilitate comparison by providing a comparison page in which two or more selected item records are displayed together, allowing the user to make direct visual comparison between the items.

A factor in enabling comparisons is ensuring that similar items, e.g. products in the same class of products, or variants of a particular product, have pages with the same visual layout. Unfortunately, in many situations, particularly with merchant-managed electronic storefronts, inconsistencies may arise and may result in consumer confusion or frustration. This can be particularly the case for merchants with very large catalogues, or catalogues that vary significantly over time, such as consignment retailers.

When managing an electronic storefront a merchant may upload images relating to a product. In many cases the images are likely stored in an order of upload, such that the first uploaded image may be designated the first image in the set of uploaded images, and may be the primary or principal image displayed on the product page. In some cases the merchant's administrative interface may permit the merchant to manually re-order images after upload to configure the ordering of the images in accordance with the merchant's preferences. This is both tedious and time-consuming for the merchant, and prone to errors in consistency. Those errors may result in inconsistent images being displayed in connection with related items, e.g. products of the same class or variants of a particular product.

The present application provides for an improved system and, in some implementations, an improved e-commerce platform, that automates the ordering and display of images relating to a product item to render it consistent with the ordering and display of a related product item. The method and system may include identifying a related product item record and using the ordered set of existing images for that related product item record to order a set of further images relating to a new product record. The method and system may employ image analysis to tag each image with one or more image attributes. The image attributes may be selected from a set of image attributes associated with that product class or category. Some image attributes may relate to viewpoint, e.g. perspective view, top view, side view, interior view, etc. Some image attributes may relate to product state, e.g. door open, lid off. Some image attributes may relate to product style or feature visible, e.g. material type, material texture, sleeve length, neckline, etc. Some image attributes are only applicable to certain product classes or categories and not others, e.g. "neckline", "cutlery shelf", etc.

The existing images in an ordered set may thus be tagged with image attributes. When new images for a set of further images are received the system may analyse the further images in order to tag them with image attributes drawn from the same product category or class. Once the further images are tagged, the system may compare the further images and the existing images by way of their image attribute tags to identify, for each further image, a corresponding existing image. On the basis of that correspondence, the further images may be automatically ordered based on the ordering of the corresponding existing images in the ordered set. The existing images may each have an associated order index indicating its position in the ordered set. Those indices may be assigned to the corresponding further images. In this manner the set of further images is ordered in a manner consistent with the ordering previously specified for a similar product item.

In some cases, the existing images may be an ordered set for the same product item or a similar product item in the same product class. More than one ordered set of existing images may be used in the analysis. In some cases, the ordered set may be one belonging to a product record for the same merchant account, or may be associated with a different merchant account.

In some instances, the merchant account providing the set of further images may specify that the set of further images relates to a specific product type, class, category, etc. In some cases, the merchant account may specify that the further images provided all relate to one new product item, i.e. that all further images provided to the system are part of a single set. However, in some cases, the system may permit upload of a plurality of images that relate to two or more product items and the system may perform an automated analysis of the uploaded images to group them into respective non-overlapping sets. The automated analysis may include image analysis to identify an item in the image and, based on identifying the item, identifying a product or product class/category to which the item relates.

In some cases, after identification (whether automatic or as specified by a merchant account) images may undergo colour dominance analysis to identify which image relates to the same product item or variant. The colour dominance analysis may be an image analysis technique that isolates the product item and then identifies one or more dominant colours in the product item. Images having the same one or more dominant colours and relating to the same type or class of product may be grouped together as a set of images relating to a single product item or variant of a product.

In a merchant account interface, automated groupings of images into sets of individual product items may be displayed for confirmation or correction. Similarly, unclassified images that cannot be automatically associated with a specific product record using dominant colour analysis may be flagged for manual input by the merchant account.

By automating the grouping and classification of images into sets relating to individual product items, and automating the ordering of images in each set based on image attribute analysis and comparison to ordered sets of existing images relating to similar product items of the same class, the methods and systems described herein enable faster and more accurate generation of consistent user interfaces showing sets of images. This is both more efficient in terms of time spent by a merchant in manually ordering images, and result in a more effective interface in terms of user retention and usefulness.

Reference will now be made to FIG. 1, which diagrammatically illustrates a simplified example system 1000 in accordance with an aspect of the present application. The example system 1000 may include an e-commerce platform 1002. The e-commerce platform 1002 may provide for one or more online storefronts. One or more of those online storefronts may be configured by and administered using a user computing device, such as a merchant device 1006. The one or more online storefronts may be browsable by a user computing device, such as a consumer device 1040. The merchant device 1006 and consumer devices 1040 connect to the e-commerce platform 1002 via one or more computing networks 1004, such as the Internet. The merchant device 1006 and consumer devices 1040 may include any suitable computing device with at least a display screen and a user input device, such as a mobile smartphone, tablet, laptop, desktop, or other such devices.

The e-commerce platform 1002 may be coupled to a database 1008. The database 1008 may be maintained by the e-commerce platform 1002. Data within the database 1008 may include product records relating to items (products or services) made available via the one or more online storefronts. Some of the product records may include images of the item. In some cases, a product record may include a plurality of images of the item. The plurality of images may be stored as an ordered set 1020, with each existing image 1022 in the ordered set 1020 having an index indicating its position or order within the ordered set 1020. At least some of the existing images 1022 may be uploaded, stored and ordered by way of user input received from one of the merchant devices 1006.

The merchant device 1006 may include, or have access to, a data storage 1010 containing a plurality of further images 1030 of product items. In some instances, some of the further images may be grouped into sets, with each set corresponding to a particular product item or variant. In some instances, the further images may not be grouped into discrete sets. In some cases, the further images are stored in a common folder or other operating system data structure.

A merchant device 1006 may connect to the ecommerce platform 1002 with login credentials corresponding to a merchant account. An administrative user interface may be displayed on the merchant device 1006 as a result, enabling the configuration and manipulation of product records and other data associated with that merchant account. In particular, the merchant may be permitted to generate one or more new product records and upload one or more further images to be associated with those respective one or more new product records. In some cases, the merchant may specify a product item, class or category for a new product record, and may upload or otherwise provide a set of further images 1030 to be associated with that new product record.

In some implementations, the merchant may be permitted to provide a link or pointer or selection through which a batch or plurality of further images 1030 are uploaded to the ecommerce platform 1002, and the ecommerce platform 1002 may be configured to identify a product item within each of the further images 1030 and to perform colour dominance analysis on the further images 1030 in order to partition them into discrete non-overlapping sets of further images 1030, with each set corresponding to a specific product item and having one or more dominant colours in common. New product records may be generated based on having identified a variant or product item within the uploaded further images 1030 and the corresponding set of further images 1030 may be associated with that new product record.

The ecommerce platform 1002 may be configured to analyze the further images 1030 to assign to each further image one or more image attributes. The image attributes may be attributes selected from a set of image attributes associated with the product class or category. Assignment of the image attributes may be based on image analysis and determination of a confidence score that reflects the determined probability that the further image 1030 reflects that image attribute. Attributes having a confidence score above a threshold value, e.g. 0.6, or 0.8, etc., may be assigned to that further image 1030.

Having tagged the further images 1030 with image attributes, the ecommerce platform 1002 may then compare the set of further images 1030 for a product record with an ordered set 1020 of existing images 1022 for a related product record. The related product record may be related in that is for a variant of the product item or for a product in the same product class or category. The comparison may include comparing image attributes assigned to the further images 1030 with image attributes assigned to the existing images 1022 in the ordered set 1020. If a sufficient match is identified, e.g. 80%, 90%, or 100% for instance, then the existing image 1022 is designated as corresponding to the further image 1030. Each further image 1030 may only correspond to one of the existing images 1022 in the ordered set 1020. Based on that correspondence, the further image 1030 is assigned the same order index as its corresponding existing image 1030. That is, the further images 1030 are ordered within the set in the same order as the existing images 1022 in the ordered set 1020.

Figure 2:
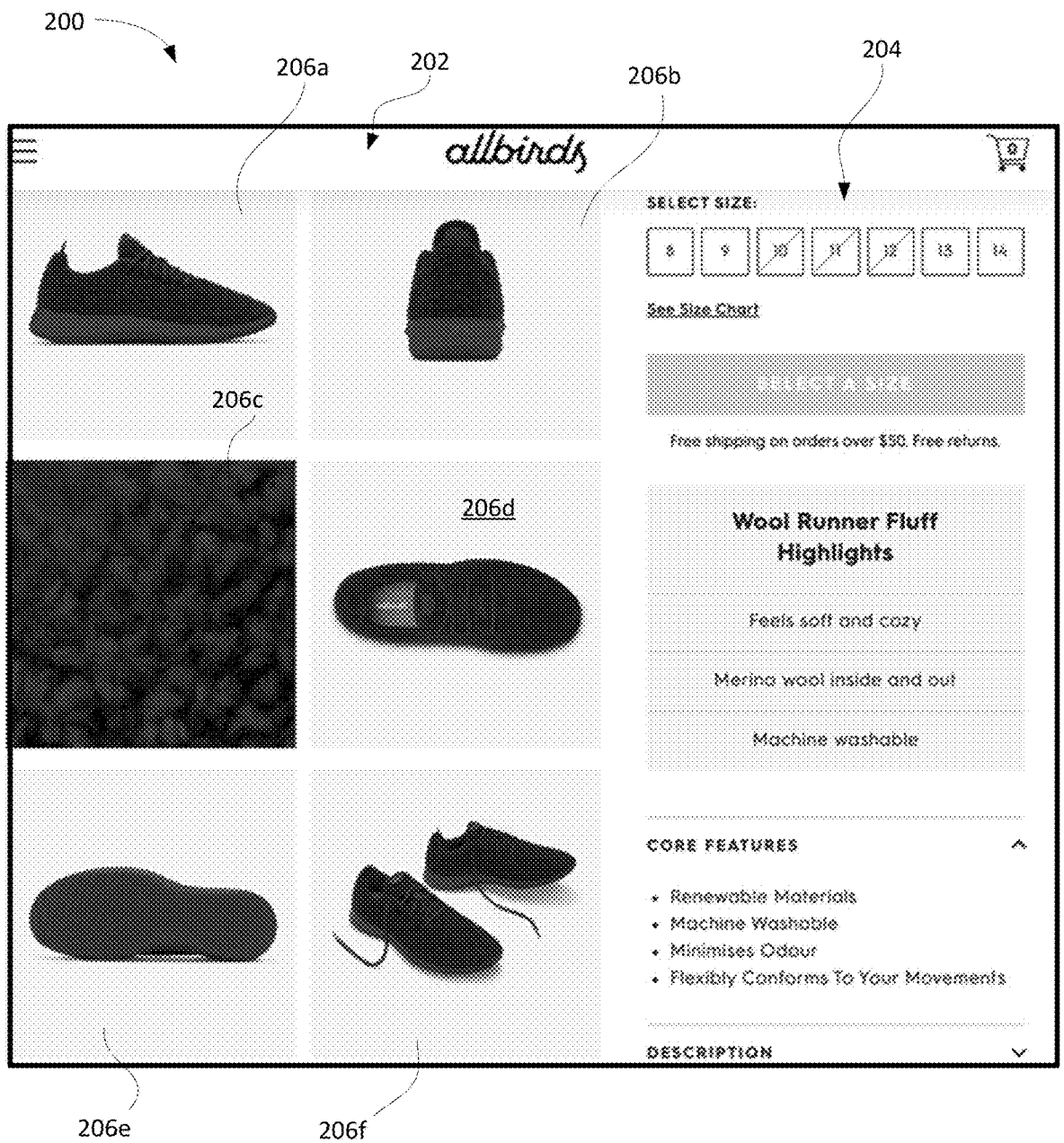
FIG. 2 is an example of a graphical user interface using a tiled layout of a set of images for an item.

To illustrate by way of example, references will now be made to FIG. 2, which shows an example graphical user interface (GUI) 200. This example GUI 200 is configured to display product information for a product record. The GUI 200 may include a product image portion 202 and a descriptive portion 204, in this example. The descriptive portion 204 may include product specifications, narrative descriptive text, customer reviews, links to other features or options, and/or a purchase button or other purchase-related interface items. The product image portion 202 may include images of the product. In this example, the product image portion 202 includes a set of images 206 (shown individually as images 206a-206f) of the product associated with the product record. In this example, the set of images 206 are shown in a tiled format in which all (or most) images of the set are displayed in full at the same time within the product image portion 202 of the GUI 200. In some cases, the images 206 may be selectable, such that selection of one of the images 206 results in display of a larger high-resolution version of that image, perhaps in an overlay window or pop-up in some cases.

The set of image 206 are displayed in an order. The order may be defined in the product record or in metadata associated with the set of images 206. In some cases, each image may have an associated index or ordinal indicating its position in the set, thereby making the set an ordered set. In this example the order defines image 206a as the first item in the set and image 206f as the last item in the set. Images 206 from the set are displayed in a left-to-right, top-to-bottom order in the tiled view of the product image portion 202 of the GUI 200.

Figure 3:
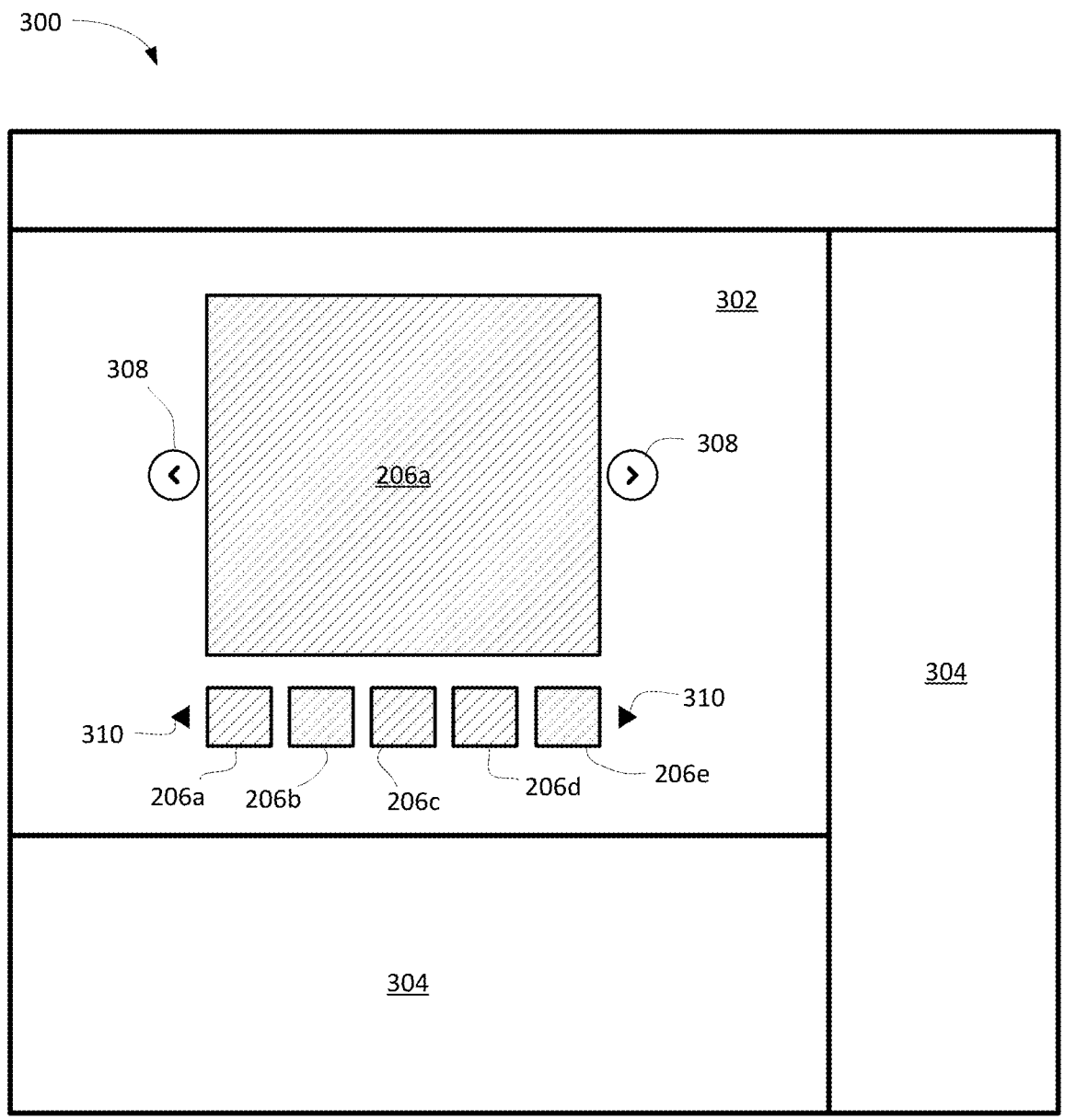
FIG. 3 is an example of a graphical user interface using a carousel layout of a set of images for an item.

FIG. 3 shows another example GUI 300. In this example, the GUI 300 may include one or more descriptive portions 304 and at least one product image portion 302. In this example the product image portion 302 may be configured to display the set of images 206 in a carrousel format. In at least some examples of carrousel format, the set of images 206, or at least a portion of the set of images 206 (depending on the display max of the carrousel and the size of the set), is displayed in small thumbnail format below a larger version of a first one of the images 206a. Selection of another of the thumbnails changes the image shown as the larger version. The GUI 300 may permit navigation through the images 206 using interface elements associated with the larger version such as forward and back arrows 308, and/or may permit navigation through the thumbnails to display thumbnails for portions of the set of images not visible in the subset shown on the GUI 300, such as through interface elements like arrows 310.

The order in which the thumbnails are displayed is set by the ordering of the set. As noted above, this may be implemented by way of associating an order index or ordinal with each image in the set. In some cases, the first image displayed as the larger version when the page is first rendered is the first image in the set, e.g. image 206a.

Figure 4:
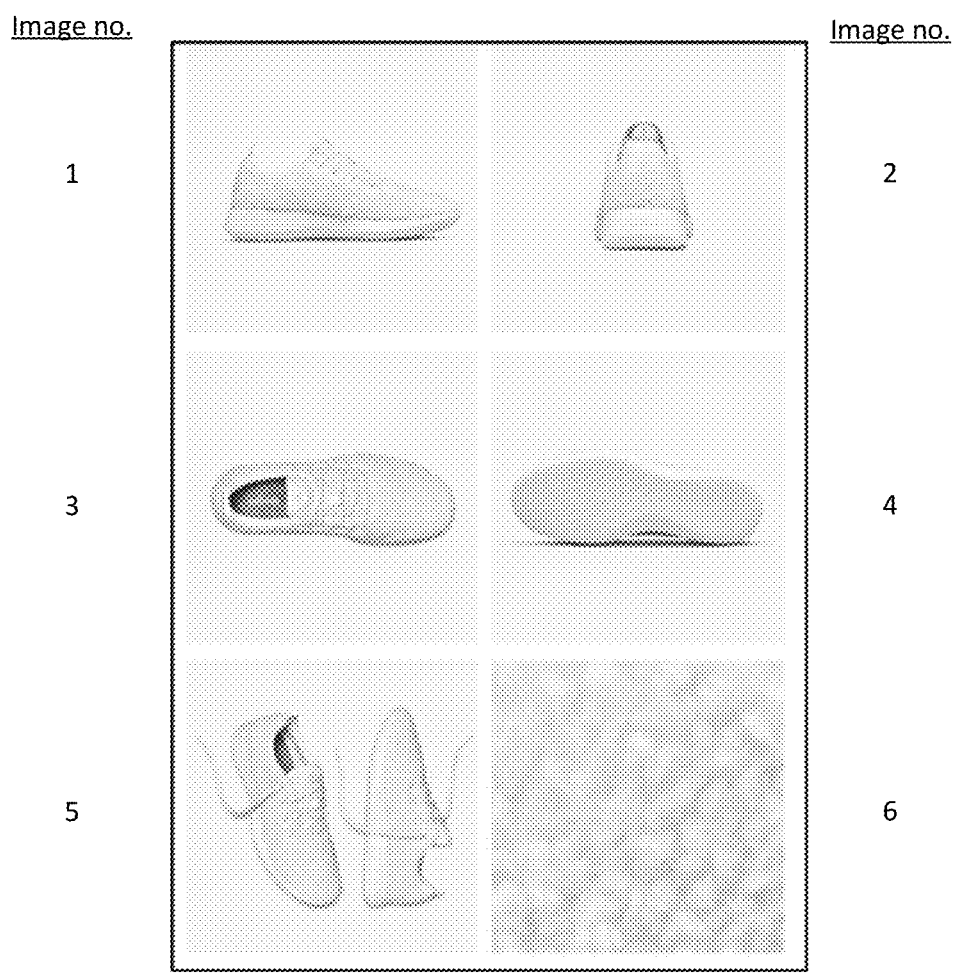
FIG. 4 is an example of a set of further images in the same category or class as an ordered set of existing images.

A merchant account may provide the platform with a set of further images. The set of further images may relate to the existing set of images by being for an item in the same product class in some cases. They may relate to the existing set of images by being for a variant of the product shown in the existing set of images in some cases. FIG. 4 shows one example set of further images 400. In this example, the further images 400 are for a pair of shoes of the same model as the shoes shown in the existing set of images in FIG. 2, but in a different colour, i.e. a variant.

Figure 5:
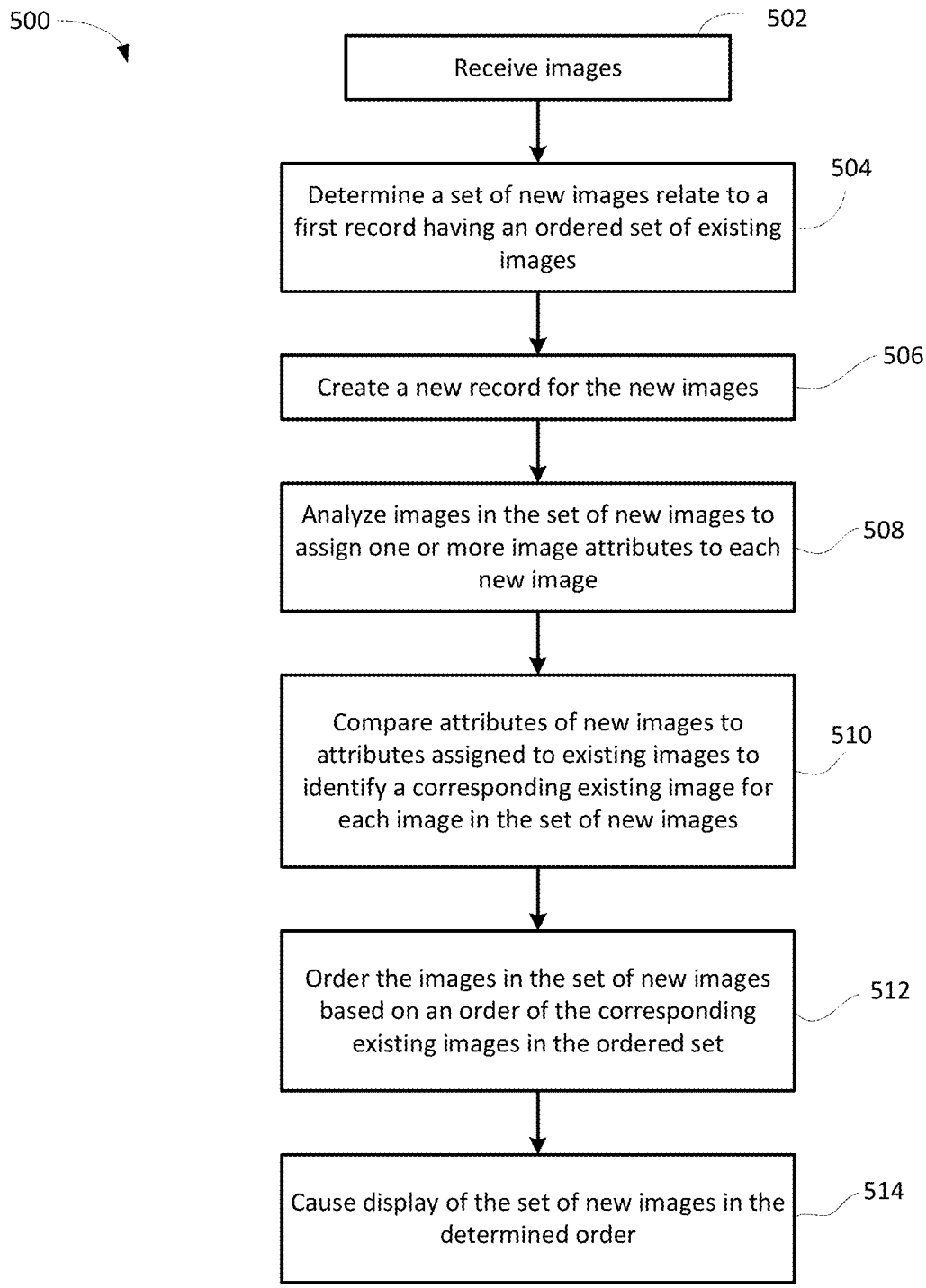
FIG. 5 shows, in flowchart form, one simplified example method for automatically generating an ordered display of a set of further images.

Reference will now be made to FIG. 5, which shows, in flowchart form, one example method 500 for automatically generating an ordered display of item images. The method 500 may be implemented by an e-commerce platform and, in particular, may be implemented by way of suitably-programmed software instructions stored in memory on a computing device which, when executed by one or more processors of the computing device, cause the computing device to carry out the described operations.

The method 500 may be implemented in the context of an e-commerce platform having a plurality of existing product records. Each of the existing product records may have its own associated set of existing images depicting that product item and/or its features. Those existing images may be in ordered sets and may have been subject to image analysis to tag each image with image attributes. The image attributes may be attributes drawn from a group of image attributes applicable to the product category or class into which the product item falls. As an example, with reference to the images 206 in FIG. 2, the images may be analyzed and tagged with image attributes. The image attributes may be associated with a confidence score that reflects the probability that the image features that attribute. Only image attributes with a sufficiently high confidence score may be assigned to an image. As an example, only confidence scores of at least 0.80 may be valid when tagging an image with image attributes. A machine learning model may be trained to analyze images and to assign attributes and confidence scores.

Example image attributes for the images in FIG. 2 may be as indicated in the table below, where the image index nos. map to reference numbers as: 206a=1; 206b=2; 206c=3; 206d=4; 206e=5; 206f=6.

| Image Index no. | Feature | Confidence score |
| --- | --- | --- |
| 1 | Shoe | 1.0 |
|  | Side profile | 0.99 |
|  | Laced | 0.82 |
|  | Ankle-height, low cut | 0.91 |

-continued

| Image Index no. | Feature | Confidence score |
| --- | --- | --- |
| 2 | Shoe | 1.0 |
|   | Rear view | 0.95 |
|   | Ankle-height, low cut | 0.88 |
| 3 | Texture/Material | 0.86 |
| 4 | Shoe | 1.0 |
|   | Top view | 0.98 |
|   | Laced | 0.84 |
| 5 | Shoe | 1.0 |
|   | Bottom view | 0.97 |
|   | Sole-grip | 0.84 |
| 6 | Shoe | 1.0 |
|   | Quantity: 2 | 0.99 |
|   | Laced | 0.98 |
|   | Ankle-height, low cut | 0.84 |

The method 500 may include receiving a set of two or more new images, e.g. a plurality of further images, in operation 502. These images may be uploaded from a merchant device, in some cases. Merchant account credentials may be received and validated to log in a merchant from a merchant device and, once authenticated, the merchant may have the option, through the merchant administrative interface, of uploading product images for new product items. In some cases, the merchant may create a new product record and then upload a set of further images designated for that new product record. In such a case, the association of the images with each other in a set is already specified by the merchant. Moreover, the merchant may have specified a product item class or category and, in some cases, further details regarding the product item, including a brand, model, and/or features.

In some cases, however, the merchant may provide a collection of new product images without specifying which images are grouped into sets as being common to a single product item. In some cases, the merchant may direct the e-commerce platform to a link or data storage location, e.g. a drive or folder, in which the plurality of images are located and accessible. In some cases, the merchant may specify only a product class but may provide a collection of images that include product item images for variants of existing product items as well as new product items.

In operation 504, the platform determines that a set of images relates to a first product record having an associated ordered set of existing images. The determination may include identifying the set of images based on image analysis from among the collection of images. In some cases, the platform may identify the set of images using colour dominance analysis, as will be described further below. In some cases, as noted above, the merchant may provide the images as a discrete set of images. The determination that the set of images relates to an existing record may be based on data provided by the merchant in some cases. In other cases, the determination may be based on image analysis by the platform. For example, having identified a set of images relating to a product item, the platform may perform image analysis with respect to one or more of the images to detect an item within the image(s) and determine a product class or category from the image analysis. On the basis of that analysis, the platform may identify one or more related product records for existing products in the same category or class. For example, other product records for "shoes", or other product records for "shoes" by the same manufacturer, or other product records for "shoes" that are of the same model.

In operation 506, the platform may generate a new product record associated with the set of further images. In many implementations, the new product record may be generated in response to input from the merchant via the merchant device, and the new product record may be initialized prior to the upload of the images. However, in some implementations, particularly where the merchant has provided a collection of images relating to two or more new product items, and the platform has automatically grouped the images into sets and has identified the corresponding product class/category for each product item, then the platform may itself generate a new product record for each identified new product item within its respective product class or category.

Irrespective of whether the set of further images is automatically identified by the platform or specified by the merchant, and irrespective of whether the platform identifies the related existing product record or whether the merchant specifies the related product record, in operation 508 the platform analyzes the further images in the set of further images to assign one or more image attributes. The image attributes available for evaluation may depend, at least in part, on the product class or category. In some cases, having identified a related product record, the image attributes may be limited to image attributes already assigned to existing images in the related product record.

As noted above, a machine learning model may be used to analyze the further images and assign image attributes that have a sufficiently high confidence score, i.e. those attributes that have more than a threshold probability of being identified in the image.

Using the example shown in FIG. 4, the platform may analyze the individual images and assign image attributes to the images based on the image analysis. A machine learning model may be applied to determine the assignment of image attributes. The image attributes may be drawn from a set of image attributes designated as possibly relevant to shoes. In some cases, the image attributes are those attributes already used in labelling the images of the ordered set of existing images, i.e. those attributes applied to the images of FIG. 2. The images may be tagged with the image attributes that meet a threshold level of probability or confidence score. In some cases, the confidence score is stored together with the attribute in association with the image to which it is assigned.

As an illustrative example, the image attributes determined and assigned to the images of FIG. 4 may be:

| Image no. | Feature | Confidence score |
| --- | --- | --- |
| 1 | Shoe | 1.0 |
|   | Side profile | 0.98 |
|   | Laced | 0.80 |
|   | Ankle-height, low cut | 0.89 |
| 2 | Shoe | 1.0 |
|   | Rear view | 0.97 |
|   | Ankle-height, low cut | 0.89 |
| 3 | Shoe | 1.0 |
|   | Top view | 0.99 |
|   | Laced | 0.87 |
| 4 | Shoe | 1.0 |
|   | Bottom view | 0.98 |
|   | Sole-grip | 0.82 |
| 5 | Shoe | 1.0 |
|   | Quantity: 2 | 0.99 |
|   | Laced | 0.98 |
|   | Ankle-height, low cut | 0.89 |
| 6 | Texture/Material | 0.83 |

In operation 510, the platform compares the further images to the existing images to identify corresponding images. That is, the platform identifies an existing image that corresponds to each further image, if possible. In some cases, the further images may not have a corresponding existing image from the ordered set, or the existing images may include an image for which there is no corresponding image in the set of further images.

Operation 510 may be implemented through comparison of image attributes assigned to the existing images and attributes assigned to the further images. In one implementation, each further image is compared to each of the existing images in the ordered set by comparing the assigned attributes of the further image to the assigned attributes of the existing images. In some cases, the comparison may take into account confidence scores; namely, that the higher the confidence score, the more essential it is for the two images to have that same attribute in order to find a match. In some cases, the comparison may require that the corresponding existing image have each of the attributes assigned to the further image; in some other cases, only a partial match may be sufficient. Various distance metrics may be used in some embodiments to determine the quality of the match between a further image's attributes and an existing image's attributes.

In the example using FIG. 2 and FIG. 4, there is a one-to-one match between image attributes that result in the following pairings of images from FIG. 2, e.g. the "existing images" and the images from FIG. 4, e.g. the "further images":

| Existing Image Index no. | Image Attributes | Further image no. |
|---|---|---|
| 1 | Shoe; Side profile; Laced; Ankle-height, low cut | 1 |
| 2 | Shoe; Rear view; Ankle-height, low cut | 2 |
| 3 | Texture/Material | 6 |
| 4 | Shoe; Top view; Laced | 3 |
| 5 | Shoe; Bottom view; Sole-grip | 4 |
| 6 | Shoe; Quantity: 2; Laced; Ankle-height, low cut | 5 |

As a result, the platform may determine that the further images should be ordered as: 1, 2, 6, 3, 4, 5, in order to be consistent with the ordering of the existing images. In operation 512, the platform applies this ordering to the set of further images. In some cases, this may include assigning the further image the index number of the corresponding image from the ordered set of the existing images. This results in ordering the further images so as to produce an ordered set of further images.

In operation 514, the platform may cause display of the set of further images in the determined order. That is, the platform may cause generation of a GUI that displays the images in the determined order. The GUI may present the images in a tiled format, a carousel format, or any other suitable format in which there is an order to the images. The GUI may display one, some or all of the images at one time. The GUI may be on a product page relating to the product item that is the subject of the further images in some cases. In some cases, the GUI may be a merchant administrative interface generated for the purpose of presenting the automated grouping and ordering of the further images for review and editing. In some cases, the GUI is in HTML or another markup language and is transmitted from the platform to an end user computing device, such as a customer device or a merchant device for display by a browser application or a dedicated e-commerce application.

As noted above in connection with FIG. 5, a merchant device may provide a set of further images and may specify the related product record, the product class, and/or generate a new product record. However, in some cases, the merchant device may upload a plurality of images that are not grouped into sets. The platform may be configured to group the images into sets. In one implementation, the grouping of images into sets may be based on colour dominance. In some instances, the grouping of images into sets by the platform may occur in cases where the merchant device has specified a product class and/or related product record. For example, a merchant device may have an existing product record and associated ordered set of existing images for a model of a particular jacket. The plurality of image may include multiple variants of the particular jacket, e.g. the same model jacket in a number of different colour options. In that case, the platform may be configured to group the images of the jacket into sets on the basis of colour dominance.

Figure 6:
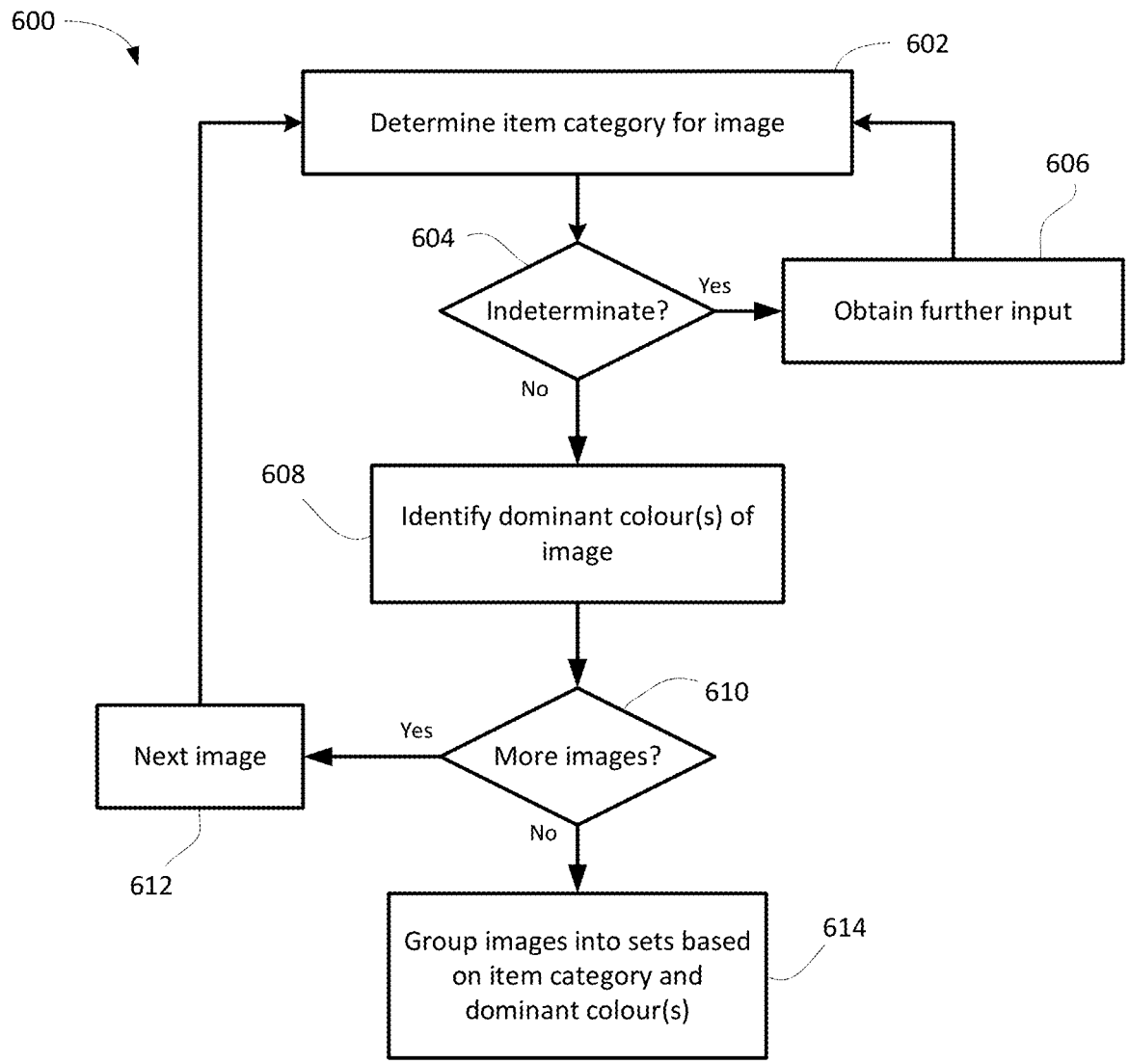
FIG. 6 shows, in flowchart form, one simplified example method for automatically grouping a plurality of images into sets using colour dominance.

FIG. 6 shows one example method 600 of grouping images on the basis of colour dominance. The method 600 may be implemented by an e-commerce platform in some examples.

The method 600 presupposes that a plurality of images have been provided for analysis. The images may be provided by a merchant device in some cases. The images in this example are images of various product items. In some cases, the images all relate to the same product item but include multiple variants.

In operation 602, the platform may determine an item category for a first one of the images. The determination of the item category may be specified by the user, such as the merchant, in some implementations. For example, the merchant may specify a product class or category before providing the image or before causing initiation of the method 600 with regard to the images. In some cases, the determination of the item category may be based on image analysis by the platform. That is, the platform may automatically identify a dominant object in the image and may determine the object type or class. A machine learning model configured for object detection may be employed by the platform to automate the process of determining the item category. If the item category is indeterminate, as indicated by operation 604, then the platform may obtain further input, as indicated by operation 606. The further input may be obtained by sending a notification to the merchant device soliciting item category selection, for example.

In operation 608, the one or more dominant colours of the image are determined. This operation may employ a further machine learning model in some cases. The determination of dominant colour or colours may be implemented partly through image analysis. In particular, at least a portion of the image may be analyzed to determine a count of pixels having a certain colour value or range of colour values. The colour data of the image may be reflected in different manners dependent upon the image encoding scheme. For instance, colour data may be represented by RGB values, chrominance values Cr and Cb, chrominance values U and V, colour hex values, or other coding schemes signaling the colour values. In some implementations, the colour palette may be quantized to reduce the number of possible colours.

The determination of colour dominance may further include isolating the item within the image before determining a dominant colour. In some cases, this may include cropping the image on the basis of item detection to remove portions of the image in which no part of the item appears.

In some cases, this may include applying a mask or non-rectangular bounding shape to isolate the item and remove non-item portions of the image. Edge detection or other image analysis operations may be used to distinguish between portions of the image containing the item and not containing the item. The cropping and/or masking operations may be customized based on the product class or category. That is, the operation of cropping or determining a mask may be partly informed by the expected shape or size or features of an item in that class/category. A machine learning model applied to determine colour dominance may be specified to the product class/category in some implementations.

The algorithm for determining the one or more dominant colours from the portion of the image containing the item of interest may use a quantization-based classification algorithm. As an example, pixel values within a certain range or distance may be clustered into classes or ranges. A k-means clustering algorithm may be used in some implementations. A distance metric may be used in some implementations.

Operation 608 may result in the identification of one or more dominant colours. In some cases, a measure of dominance may also be determined. For example, if a certain shade or range of blue values is found to be dominant, the degree of dominance may be determined, e.g. that the colour is found in, for instance, 42% of pixels for the item of interest.

Once the one or more dominant colours are determined, then in operation 610, the platform assesses whether there are more images to be analyzed. If so, then in operation 612 the platform obtains the next image may return to operation 602. In the case where the merchant or other administrator has specified an item category for the set of images, then the method 600 may go directly back to operation 608 to identify the dominant colour of the next image in the set. If the item category is not pre-selected or determined for the whole set of images, or if item categories are not specified by the merchant for each image in the set, then the method 600 may return to operation 602 in order to determine the item category of the next image in the set.

If the platform has completed analysis of the images, then in operation 614 it groups the images based on item category and dominant colour analysis. That is, those images that relate to the same product category or class are then further subdivided into sets of images that feature the same one or more dominant colours. This may result in partitioning the image such that each set reflects a specific variant and/or product item. For example, if the merchant provides a plurality of images of shoes but relating to a number of different brands and/or models, the dominant colour analysis may result in grouping the images into sets that correspond to distinct brands and/or models.

Images for which dominant colours cannot be identified or that have indeterminate dominant colour results, that cannot be associated with a set based on dominant colour analysis, may be flagged for review. Those images may be presented to a user, such as through a merchant administrative user interface, for further categorization. The merchant may have the option of adding the un-classified image to one of the sets generated by the platform, designating it as its own set relating to a distinct variant or product item, or removing the image.

The resulting sets may be presented to a user, such as through a merchant administrative user interface, for validation and/or correction. Corrections or modifications may be fed back to the platform to improve the machine learning models, in some cases.

Figure 7:
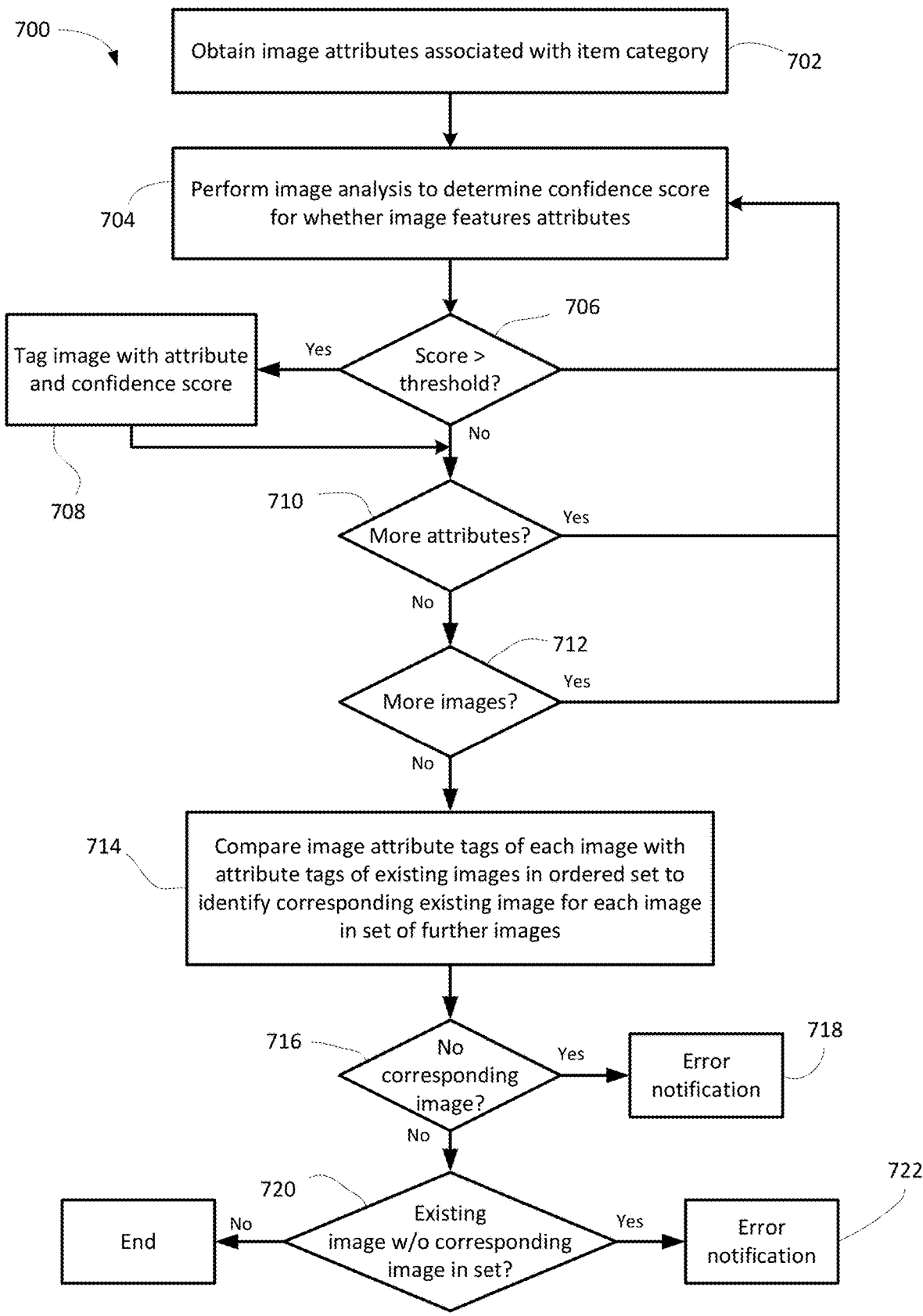
FIG. 7 shows, in flowchart form, one simplified example method of identifying a respective existing image in an ordered set that corresponds to each further image on the basis of image attributes.

Reference will now be made to FIG. 7, which shows, in flowchart form, one example method 700 for automatically ordering images for display in a graphical user interface. The method 700 may be implemented by an e-commerce platform and, in particular, may be implemented by way of suitably-programmed software instructions stored in memory on a computing device which, when executed by one or more processors of the computing device, cause the computing device to carry out the described operations.

The method 700 may be implemented in the context of an e-commerce platform having a plurality of existing product records. Each of the existing product records may have its own associated set of existing images depicting that product item and/or its features. Those existing images may be in ordered sets and may have been subject to image analysis to tag each image with image attributes. The image attributes may be attributes drawn from a group of image attributes applicable to the product category or class into which the product item falls.

The method 700 is applied in the context of having received a set of further images associated with a particular item category, e.g. product class or category. As noted above, the platform may automatically group images into sets on the basis of image analysis, such as colour dominance analysis, or the uploading device may provide information for grouping images into sets, or a single set of images may be provided. The item category or class may be indicated by the uploading device or may be automatically determined by the platform based on image analysis and object detection.

In operation 702, the platform obtains a set of image attributes associated with the item category. In some cases, the image attributes specific to an item category are stored in memory and may be retrieved based on the identified image category. In some cases, the image attributes are those attributes used to tag existing images associated with one or more existing product records in the same item category or class. That is, the platform may identify one or more existing product records related to the further images by way of being in the same item category and may, on the basis of those related existing product records, identify image attributes applicable to that item category.

In operation 704, the platform performs image analysis on a first image in the set of further images to determine whether the image displays or features a first of the image attributes. The image analysis may be based on a feature detection algorithm. In some embodiments, a machine learning model may be trained to identify features in images and corresponding correlation of the image with an image attribute. The machine learning model may be specifically trained with respect to the identified item category. The analysis may result in a confidence score (e.g. a probability value) indicating the likelihood that the image features this particular image attribute.

In operation 706, the platform assesses whether the confidence score is above a threshold level. The threshold may be set or selected to a value sufficiently high to avoid over-tagging images with marginal relevance to the attribute, and sufficiently low to avoid missing attributes that are present but not explicitly clear in the image. In some cases a threshold of 0.7, 0.8, or 0.9 may be suitable.

If the confidence score is higher than the threshold level then in operation 708 the image is tagged with that image attribute. In some implementations, this includes the confidence score associated with the image attribute.

In operation 710 the platform assesses if there are further image attributes to be evaluated with regard to this image. If so, it moves to the next attribute and returns to operation 704. If not, then it is done tagging this image and it assesses whether there are further images in the set in operation 712. If so, it moves to the next image and returns to operation 704 to begin analyzing the next image and whether it exhibits the first image attribute.

Once all of the images in the set have been tagged, the platform then, in operation 714, compares the set of further images to one or more sets of existing images in the same product category or class. That is, it compares the attributes assigned to the images in the set of further images with the attributes assigned to the existing images in the ordered set of existing images with a view to finding an existing image that corresponds to each of the further images. In some cases, a one-to-one match between image attributes may be required to identify a correspondence between a further image and an existing image. In some cases, a sufficient match may be identified even if not all image attributes are shared. For example, if the images have at least 80% of the same image attributes, or some other metric indicating sufficient similarity, then the images may be considered to be corresponding. If more than one existing image has image attributes that partially match the image attributes of a further image, the one with the most similar attributes may be identified as the corresponding image.

Through the identification of corresponding existing images, an ordering is then applied to the images in the set of further images. That is, the images in the set of further images are ordered to match the order of their respective corresponding images in the ordered set of existing images. As noted earlier, this may include assigning to each further image an order index or other position indicia that matches the order index/indicia assigned to its corresponding existing image from the ordered set.

In operation 716, it is assessed whether there are images in the set of further images for which the platform was unable to identify a corresponding existing image. If so, then an error notification may be output in operation 718 with regard to that image from the set of further images. It may indicate that an extra image of the product variant has been erroneously grouped in the set that is inconsistent with other product items of the same type or that an image has been erroneously included in the set that does not relate to the product item or variant. A merchant device may be provided with an interface for modifying or re-classifying the image so identified.

In operation 720, it is assessed whether there are images in the ordered set of existing images for which there is no corresponding image in the set of further images. If so, then in operation 722 an error notification may be output with regard to the set of further images noting that an image may be missing thereby resulting in an inconsistent set of images for the new product record. A merchant device may be provided with an interface for modifying the product record or adding a new further image to correct for the omission.

The method 700 results in an ordered set of further images, where the ordering has been automated so as to obtain consistent display ordering with regard to one or more ordered sets of existing images relating to the same product class or category.

In any of the above-described example methods or processes it will be understood that certain operations described as occurring in sequence may be implemented in a different sequence or carried out in parallel without impacting the overall functioning of the method or process.

Many of the above-described methods may be implemented by way of suitably-programmed computing device.

Figure 8:
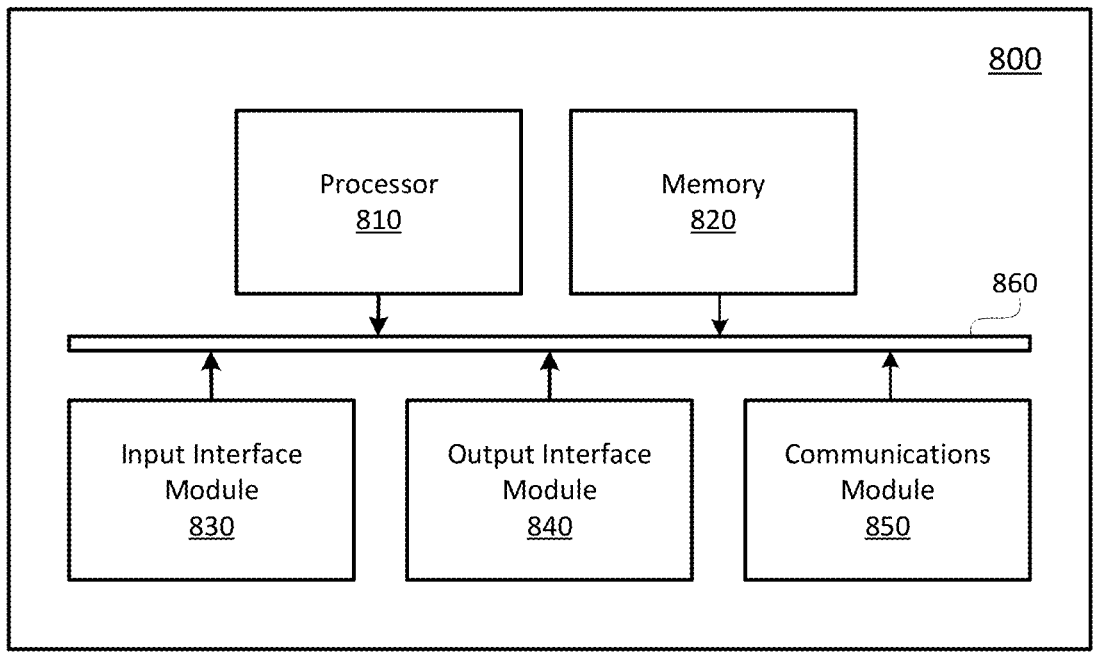
FIG. 8 is a high-level schematic diagram of a computing device.

FIG. 8 is a high-level diagram of an example computing device 800. The example computing device 800 includes a variety of modules. For example, the example computing device 800 may include a processor 810, a memory 820, an input interface module 830, an output interface module 840, and a communications module 850. As illustrated, the foregoing example modules of the example computing device 800 are in communication over a bus 860.

The processor 810 is a hardware processor. The processor 820 may, for example, be one or more ARM, Intel x86, PowerPC processors, or the like.

The memory 820 allows data to be stored and retrieved. The memory 820 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 800.

The input interface module 830 allows the example computing device 800 to receive input signals. Input signals may, for example, correspond to input received from a user. The input interface module 830 may serve to interconnect the example computing device 800 with one or more input devices. Input signals may be received from input devices by the input interface module 830. Input devices may, for example, include one or more of a touchscreen input, keyboard, trackball or the like. In some embodiments, all or a portion of the input interface module 830 may be integrated with an input device. For example, the input interface module 830 may be integrated with one of the aforementioned example input devices.

The output interface module 840 allows the example computing device 800 to provide output signals. Some output signals may, for example, allow provision of output to a user. The output interface module 840 may serve to interconnect the example computing device 800 with one or more output devices. Output signals may be sent to output devices by output interface module 840. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 840 may be integrated with an output device. For example, the output interface module 840 may be integrated with one of the aforementioned example output devices.

The communications module 850 allows the example computing device 800 to communicate with other electronic devices and/or various communications networks. For example, the communications module 850 may allow the example computing device 800 to send or receive communications signals. Communications signals may be sent or received according to one or more protocols or according to one or more standards. For example, the communications module 850 may allow the example computing device 800 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 850 may allow the example computing device 800 to communicate using near-field communication (NFC), via Wi-Fi™, using Bluetooth™ or via some combination of one or more networks or protocols. Contactless payments may be made using NFC. In some embodiments, all or a portion of the communications module 850 may be integrated into a component of the example computing device 800. For example, the communications module may be integrated into a communications chipset.

Software comprising instructions is executed by the processor 810 from a computer-readable medium. For example, software may be loaded into random-access memory from persistent storage of memory 820. Additionally, or alternatively, instructions may be executed by the processor 810 directly from read-only memory of the memory 820.

Figure 9:
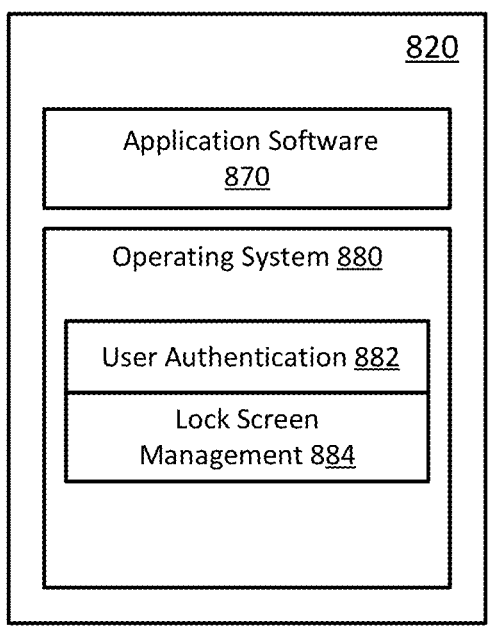
FIG. 9 shows a simplified organization of software components stored in a memory of the computing device of FIG. 8.

FIG. 9 depicts a simplified organization of software components stored in memory 820 of the example computing device 800. As illustrated, these software components include, at least, application software 870 and an operating system 880.

The application software 870 adapts the example computing device 800, in combination with the operating system 880, to operate as a device performing a particular function. While a single application software 870 is illustrated in FIG. 9, in operation, the memory 820 may include more than one application software and different application software may perform different operations.

The operating system 880 is software. The operating system 880 allows the application software 870 to access the processor 810, the memory 820, the input interface module 830, the output interface module 840 and the communications module 850. The operating system 880 may, for example, be iOS™, Android™, Linux™, Microsoft Windows™, or the like.

The operating system 880 provides various system services for the example computing device 800. User authentication services 882 includes a suite of services relating to credential enrollments and authentication of device users. For example, user authentication services 882 may include initial enrollment of credentials (e.g., PIN, pattern, password, or the like), credentials management, and processing of authentication tokens. Lock screen management services 884 relate to enabling, disabling, and modifying lock screens on the example computing device 800, and may include graphical user interface (GUI) control, display management, user input processing, and device unlock support.

One or more of the computing devices 800 may be used to implement the e-commerce platform 1002 (FIG. 1) in some examples. The merchant device 1006 (FIG. 1) and/or the customer device 1040 (FIG. 1) may be implemented by the computing device 800 in some cases.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 10:
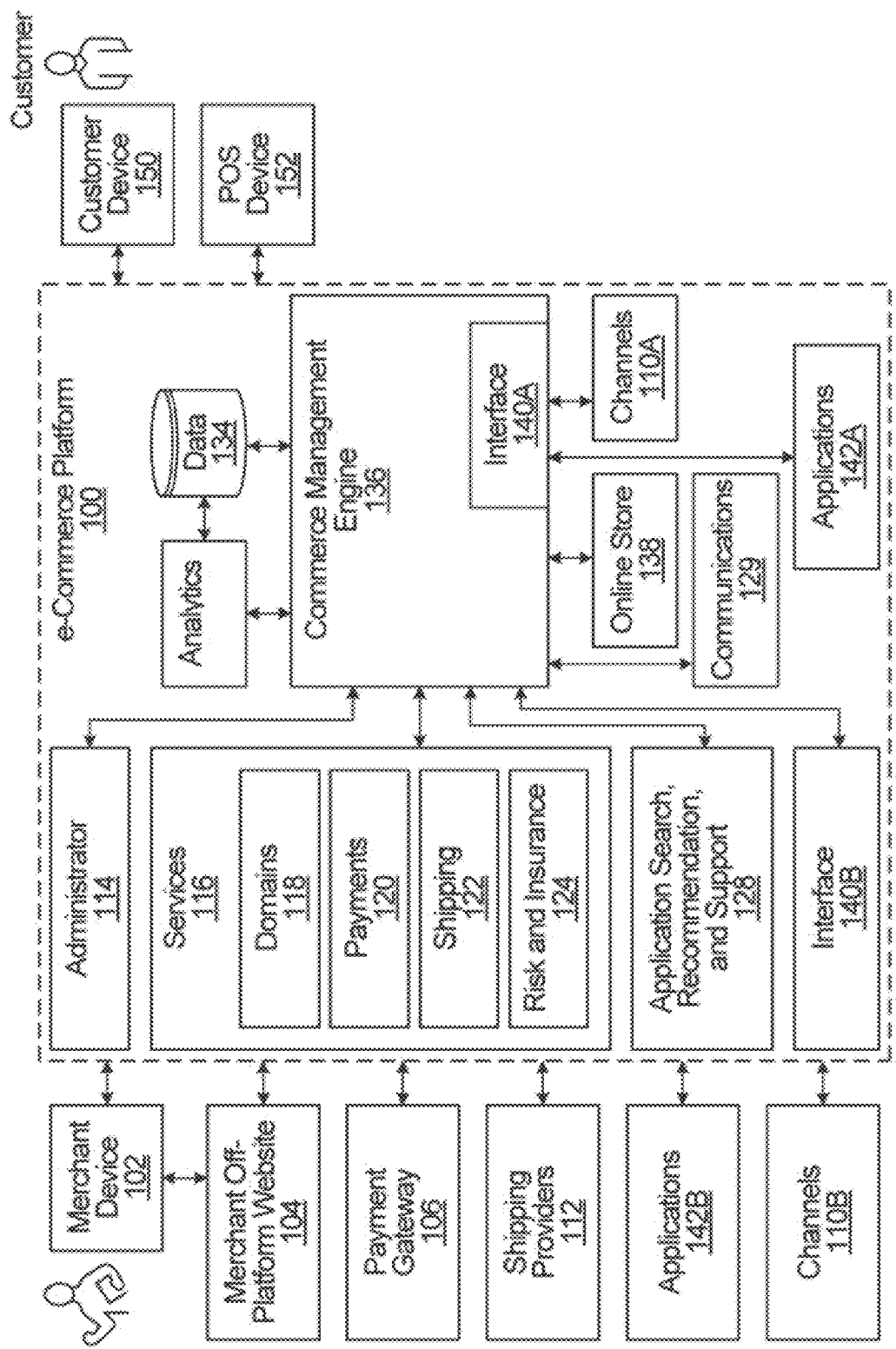
FIG. 10 is a block diagram of an e-commerce platform, in accordance with an example embodiment.

FIG. 10 illustrates an example e-commerce platform 100, according to one embodiment. The e-commerce platform 100 may be exemplary of the e-commerce platform described with reference to FIG. 11. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 10, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like).

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colours, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 11:
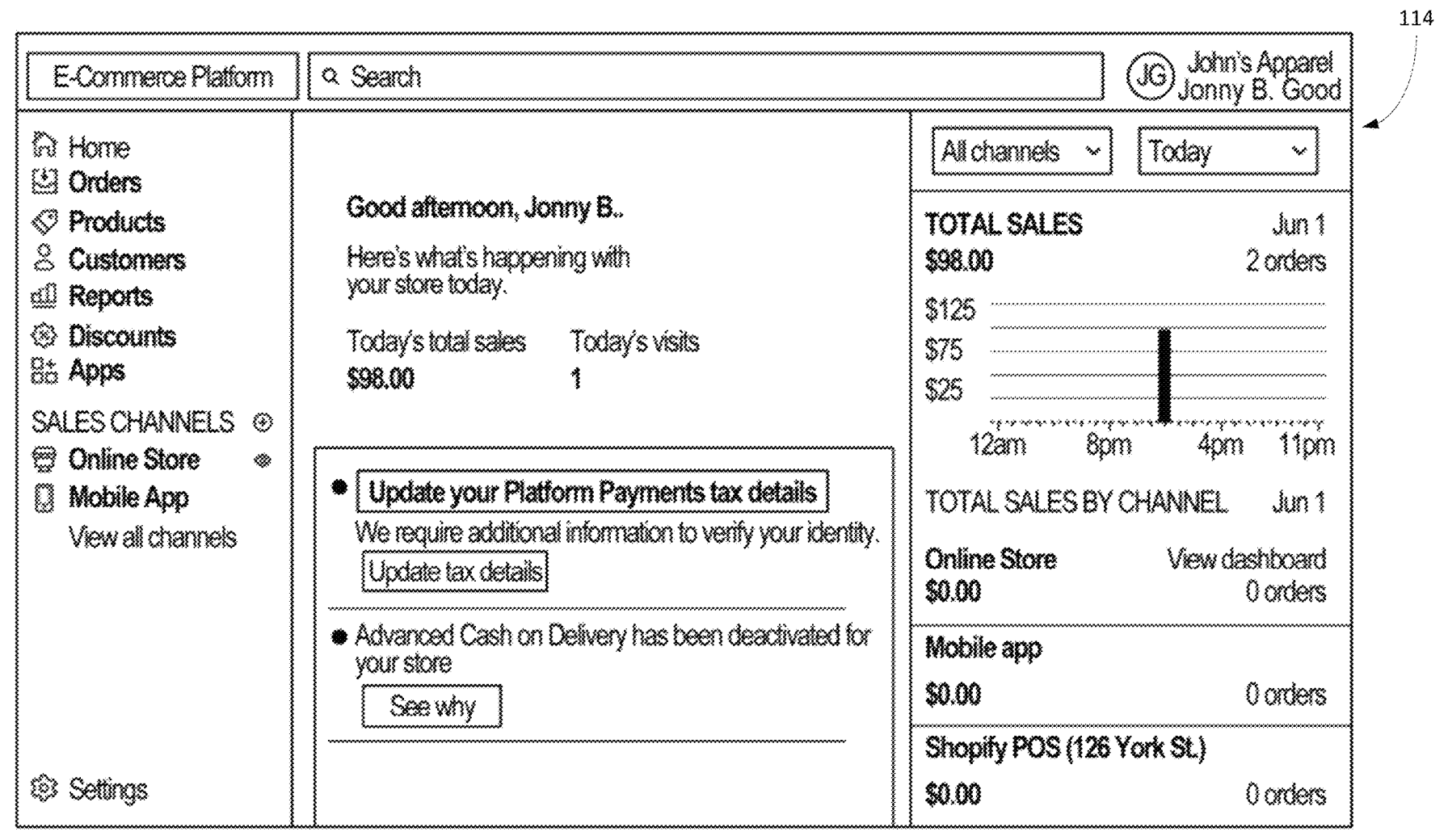

FIG. 11 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 11. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 10, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and colour, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
   receiving a set of further images related to a first record, the first record referencing an ordered set of existing images, each of the existing images being assigned one or more respective image attributes;
   generating, based on the first record, a new record referencing the set of further images;
   assigning, using image analysis, at least one of the one or more respective image attributes to each image in the set of further images;
   comparing the at least one of the one or more respective image attributes assigned to the further images with the one of more respective image attributes assigned to the existing images to determine, for each of the further images, a corresponding one of the existing images;
   ordering the further images based on the determined corresponding ones of the existing images and the ordering of those existing images in the ordered set of existing images; and
   causing display, within a graphical user interface, of the further images as ordered.

2. The method of claim 1, wherein the set of further images is related to the first record on the basis that the set of further images depict a variant of an item shown in the ordered set of existing images.

3. The method of claim 1, wherein the set of further images is related to the first record on the basis that the first record relates an item in a product class, and the set of further images contains a new item in the product class.

4. The method of claim 1, wherein the receiving the set of further images includes receiving a plurality of images related to the first record, identifying one or more dominant colours in each of the plurality of images, grouping the images within the plurality of images into non-overlapping sets of images based on all images in each non-overlapping set having same one or more dominant colours, and wherein the set of further images is one of the non-overlapping sets.

5. The method of claim 1, further comprising determining that the set of further images are related to the first record by performing object detection within one or more of the further images to identify a subject item, and determining that the first record is for an item corresponding to the subject item.

6. The method of claim 5, wherein determining that the first record is for the item corresponding to the subject item is based on determining that the item and the subject item are variants of a same product.

7. The method of claim 1, wherein the one or more respective image attributes include one or more of a view direction, a product style option, or a visual product feature.

8. The method of claim 7, wherein the one or more respective image attributes assigned are selected from a set of image attributes associated with a product class for the first record.

9. The method of claim 1, wherein each of the existing images has an order index indicating its position in the ordered set, and wherein the ordering the further images includes assigning each of the further images the order index of its respective corresponding one of the existing images.

10. The method of claim 9, wherein the one or more respective image attributes include a view direction, and wherein the comparing includes matching the view direction assigned to each further image in the set of further images with a same view direction assigned to the corresponding ones of the existing images and, based on that matching, assigning to each of the further images the order index of its respective corresponding one of the existing images.

11. The method of claim 1, further including selecting a machine learning model from a set of models based on a product type associated with the first record, and wherein the assigning, using image analysis, includes applying the machine learning model to identify the image attributes to be assigned to the further images.

12. The method of claim 1, wherein the comparing further includes determining that none of the further images have assigned image attributes that match an image attribute assigned to one of the existing images and, in response, outputting a warning notification regarding a missing image for the new record.

13. The method of claim 1, further comprising receiving, from an administrator device, the ordered set of existing images and assigning, by a machine learning model, the one or more respective image attributes to each of the existing images.

14. A computing device, comprising:
a processor;
a data storage containing a first record referencing an ordered set of existing images being assigned one or more respective image attributes; and
a memory coupled to the processor, the memory storing instructions that, when executed by the processor, are to cause the processor to:
receive a set of further images related to the first record;
generate, based on the first record, a new record referencing the set of further images;
assign, using image analysis, at least one of the one or more respective image attributes to each image in the set of further images;
compare the at least one of the one or more respective image attributes assigned to the further images with the one or more respective image attributes assigned to the existing images to determine, for each of the further images, a corresponding one of the existing images;
order the further images based on the determined corresponding ones of the existing images and the ordering of those existing images in the ordered set of existing images; and
cause display, within a graphical user interface, of the further images as ordered.

15. The computing device of claim 14, wherein the instructions, when executed, are to further cause the processor to receive a plurality of images related to the first record, identify one or more dominant colours in each of the plurality of images, group the images within the plurality of images into non-overlapping sets of images based on all images in each non-overlapping set having same one or more dominant colours, and wherein the set of further images is one of the non-overlapping sets.

16. The computing device of claim 14, wherein each of the existing images has an order index indicating its position in the ordered set, and wherein the instructions, when executed, are to cause the processor to order the further images by assigning each of the further images the order index of its respective corresponding one of the existing images.

17. The computing device of claim 16, wherein the one or more respective image attributes include a view direction, and wherein the instructions, when executed, are to cause the processor to compare by matching the view direction assigned to each further image in the set of further images with a same view direction assigned to the corresponding ones of the existing images and, based on that matching, assigning to each of the further images the order index of its respective corresponding one of the existing images.

18. The computing device of claim 14, wherein the instructions, when executed, are to further cause the processor to select a machine learning model from a set of models based on a product type associated with the first record, and wherein the assigning, using image analysis, includes applying the machine learning model to identify the image attributes to be assigned to the further images.

19. The computing device of claim 14, wherein the instructions, when executed, are to cause the processor to compare by determining that none of the further images have assigned image attributes that match an image attribute assigned to one of the existing images and, in response, outputting a warning notification regarding a missing image for the new record.

20. A non-transitory, computer-readable medium storing computer-executable instructions that, when executed by a processor, are to cause the processor to:
receive a set of further images related to a first record, the first record referencing an ordered set of existing images, each of the existing images being assigned one or more respective image attributes;
generate, based on the first record, a new record referencing the set of further images;
assign, using image analysis, at least one of the one or more respective image attributes to each image in the set of further images;
compare the at least one of the one or more respective image attributes assigned to the further images with the one or more respective image attributes assigned to the existing images to determine, for each of the further images, a corresponding one of the existing images;
order the further images based on the determined corresponding ones of the existing images and the ordering of those existing images in the ordered set of existing images; and
cause display, within a graphical user interface, of the further images as ordered.

* * * * *